March 14, 1944.  P. S. VAUGHAN ET AL  2,344,430
TORSIONAL VIBRATION DAMPER
Filed July 22, 1943  2 Sheets-Sheet 2
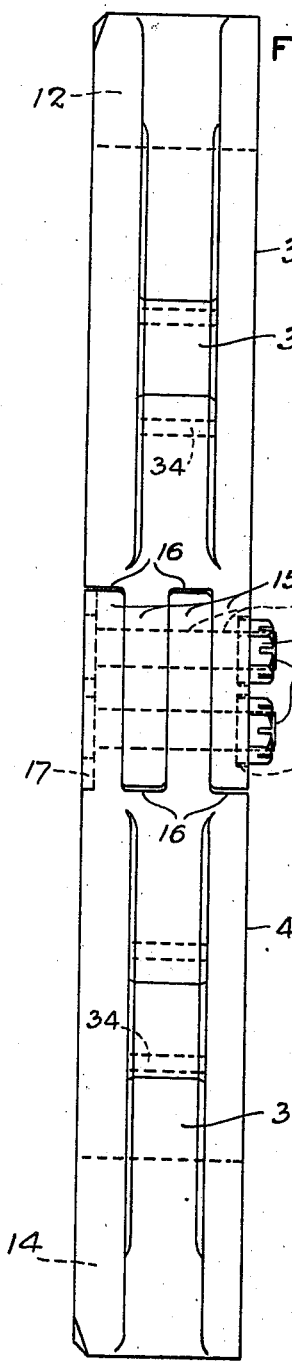
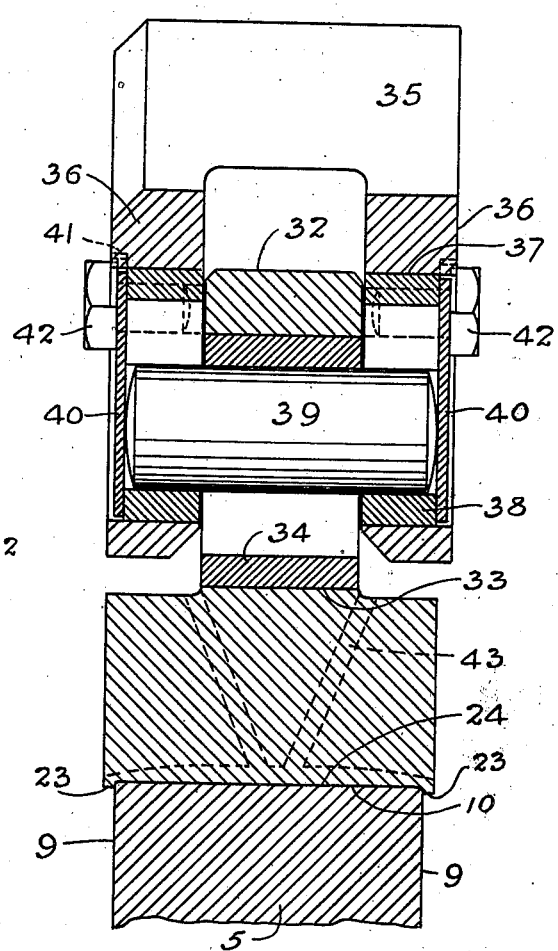
INVENTORS
Paul S. Vaughan
Arthur W. Infanger
BY
S. C. Yeaton
ATTORNEY Patented Mar. 14, 1944

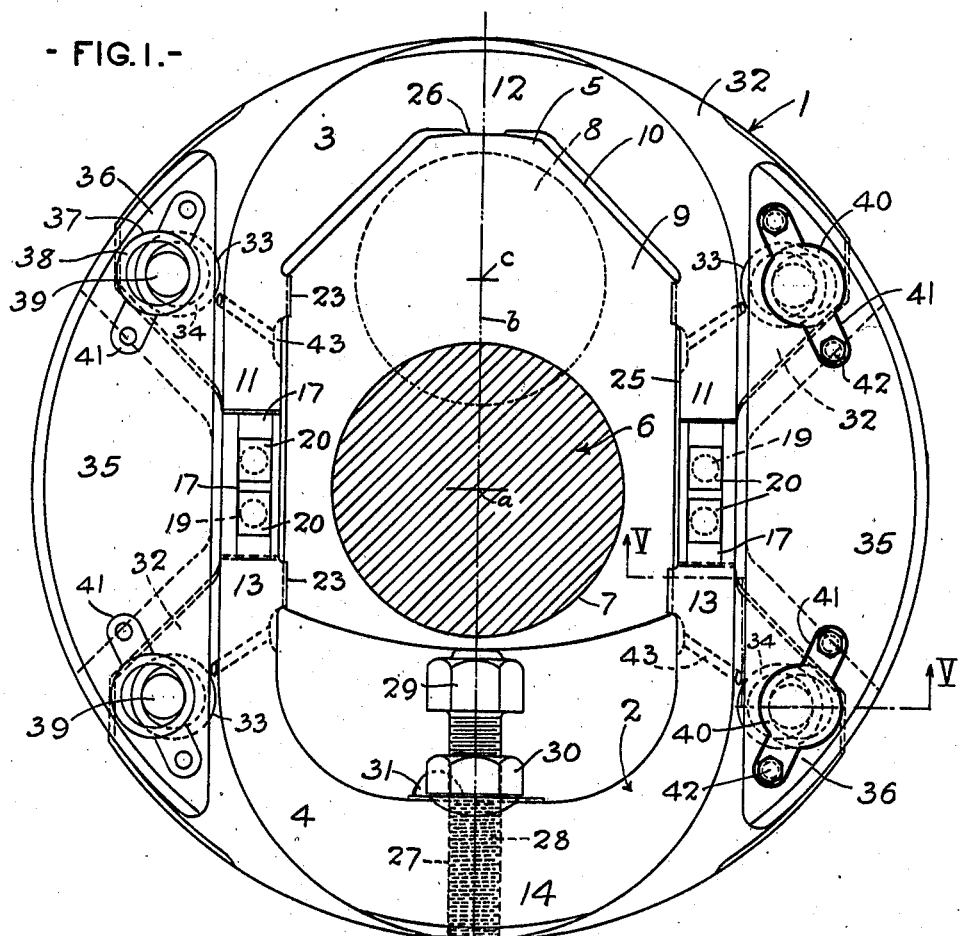
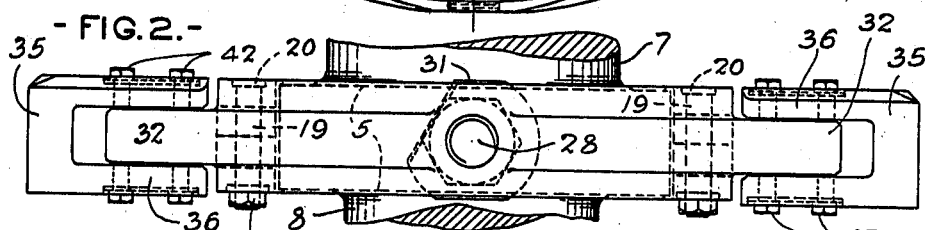
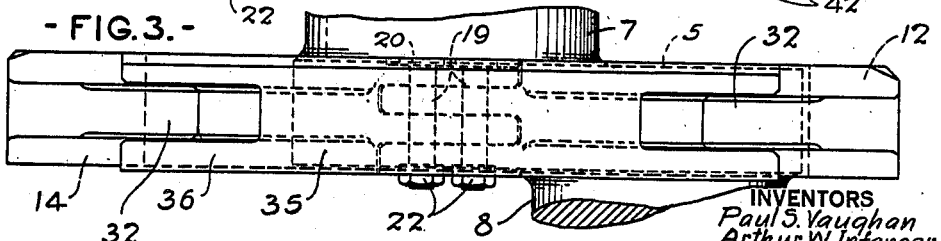

2,344,430

UNITED STATES PATENT OFFICE 2,344,430

TORSIONAL VIBRATION DAMPER

Paul S. Vaughan, Auburn, and Arthur W. Infanger, Cayuga, N. Y., assignors to American Locomotive Company, New York, N. Y., a corporation of New York Application July 22, 1943, Serial No. 495,710

5 Claims. (Cl. 74—604)

This invention relates to torsional vibration dampers.

An object of the present invention is to provide a torsional vibration damper which may be assembled with a conventional engine crank shaft without alteration of the crank shaft.

Other and further objects of and advantages achieved by the present invention will be apparent from the following description of an approved embodiment thereof.

Referring to the drawings forming a part of this application, Figure 1 is an elevation of the damper of the present invention assembled with the crank shaft, a crank shaft journal being shown in section; Fig. 2 is an inverted plan of Fig. 1, a portion of the crank shaft being shown; Fig. 3 is a side elevation, viewed from the right, of Fig. 1, turned clockwise ninety degrees, a portion of the crank shaft being shown; Fig. 4 is an enlarged side elevation of the damper, viewed from the right, of Fig. 1, the pendulum being omitted; and Fig. 5 is an enlarged section on the line V—V of Fig. 1, turned counter-clockwise ninety degrees, parts being shown in full.

It is well known to mount torsional vibration dampers on engine crank shafts. In the ordinary case, the crank shaft is designed so that the damper may be mounted thereon.. However, it is often desirable to employ dampers with engines already designed without provision for mounting the damper, or on engines already built. Again, it is sometimes desirable to add another damper to an engine already built, in which case the damper must be mounted on the crank shaft at some other portion than that usually employed.

The present invention is directed toward the solution of the above stated problems. In accordance therewith a damper is provided that can be mounted on a conventional crank web of a conventional engine without altering the crank web to receive the damper.

Referring to the drawings, the damper is indicated generally by the reference numeral 1. It is of the type known as a resonance pendulum damper. However, the invention is not confined to any particular type of damper, but has application to various types of dampers and their association with an engine crank shaft.

The damper 1 includes a hub 2, the hub forming an important part of the present invention. The hub is made in two parts 3 and 4. Each part is U-shaped, that is approximately semi-annular in shape, so that when the two parts are connected together, the hub is approximately annular in shape. The hub is mounted on a crank web 5 of a crank shaft 6. In the drawings the crank web is shown as being disposed between a journal 7 and a crank pin 8 of the crank shaft. However, the hub may be mounted on a crank web disposed between two crank pins if desired. Crank web 5 has transverse faces 9, from one of which extends the journal 7 and from the other of which extends the crank pin 8, and a peripheral face 10.

Hub part 3, as aforesaid, is U-shaped. It has two legs 11 and a yoke 12 connecting the legs. Hub part 4 also, as aforesaid, is U-shaped and has two legs 13 and a yoke 14 connecting its legs. The legs 11 and 13 are similar. Each terminates in a fork providing two tongues 15 and two grooves 16, one of the grooves of each leg being at the outside. Therefore when the parts are disposed with the legs of one part extending toward the legs of the other part, the tongues and grooves interfit, all as is clearly shown in Fig. 4.

One tongue 15 of each leg of part 4 is flush with the adjacent transverse face of the leg and a groove 17 is formed therein, extending longitudinally of the leg. The tongues are orificed parallel to the axis $a$ of the crank shaft, the orifices 18 of interfitting tongues being aligned for the passage therethrough of bolts 19 which secure the two hub parts 3 and 4 tightly together, as is shown in Figs. 3 and 4. The heads 20 of the bolts are rectangular and are disposed in the grooves 17, preventing their turning. One tongue of each leg of hub part 3 is flush with the adjacent transverse face of the leg and sockets 21 are formed therein, nuts 22 of bolts 19 being disposed in these sockets. Nuts 22 may be held against loosening rotation by cotter pins (not shown) in a well-known manner, the slots for the cotter pins being shown in Fig. 4.

Each of the legs 11 and 13 further has two opposed flanges or lips 23 extending inwardly in overlapping relation with the crank web faces 9, to form with the face of the leg therebetween a slot or guide 24, of a width just sufficient to permit the hub parts 3 and 4 to be slid radially on the crank web 5, as shown in Fig. 5. The lips 23 prevent axial displacement movement of the hub 2 relative to the crank web.

The hub 2 has an inner face 25 formed partly by the inner face of part 3 and partly by the inner face of part 4. The inner face of part 3 is shaped somewhat similar to the adjacent portion of the peripheral face of the crank web, as is shown in Fig. 1, and a filing pad 26 is formed on the inner face 25 providing a face for engagement with the crank web in the plane *b* passing through the axis *a* and the axis *c* of the crank pin.

Yoke 14 is spaced from the opposite portion of the peripheral face 10. A threaded orifice 27 is formed in yoke 14 and a set screw 28 is threaded in orifice 27 at one end and bears against the crank web at the other end. A wrench fitting 29 is formed on the screw 28 so that the screw may be adjusted for tightly engaging the crank web. A lock nut 30 secures the screw in its proper adjusted position. A lock washer 31, having a face engaging the adjacent transverse face of yoke 14, and being bent to provide a face engaging the adjusted nut 30, secures the nut 30 against loosening.

When the hub 2 is secured on the crank web 5, it must be in substantial dynamic balance. To secure such balance, the filing pad 26 may be filed until the axis of the damper 1 coincides with the axis *a* of the crank shaft 6.

Four plates or wings 32 extend transversely outwardly from the hub 2, perpendicular to the axis *a*, one from each leg and the adjacent portion of the adjacent yoke 12 or 14, as the case may be. The two wings on one side of the plane *b* cooperate to provide bearings for a damping mass or pendulum (later to be described), and the two wings on the other side of the plane *b* similarly cooperate for another pendulum. Only the structure on one side of the plane *b* will be described, as the other structure is similar.

The two wings 32 together form a damper web. An orifice 33 is formed in each wing parallel to the axis *a*, and a bushing 34 is secured in each orifice 33. A damping mass or pendulum 35, having forked end portions 36, is secured to the damper web, the wings being disposed one in each of the forks of the end portions. An orifice 37 having a bushing 38 is formed in each branch of each fork, the orifices 37 of each fork being aligned. Orifices 33 and 37 are of the same diameter and bushings 34 and 38 are of the same diameter. The orifice of each bushing 34 is offset from and overlaps the orifices of the adjacent bushings 38 providing a clear way for a roller 39 of smaller diameter than the orifices of bushings 34 and 38. Rollers 39 thereby secure the pendulums to the hub for oscillation relative thereto. This type of pendulum connection for a torsional vibration damper is well known and is described in the Chilton United States Patent No. 2,112,984, dated April 5, 1938, to which reference may be had for fuller understanding of the construction and operation of the connection. The roller is held in position by retainers 40 set in recesses 41 in the outer faces of the branches of the forks and secured therein by tap bolts 42.

The hub, at the ends thereof adjacent the yokes, has arcuate peripheries struck from the axis *a*, and each pendulum 35 has an outer arcuate periphery of a radius slightly less than the radius of the hub peripheries and struck from a center spaced slightly from the axis *a*, so that when the pendulums are in the outermost positions as shown in Fig. 1, their arcuate peripheries and the arcuate peripheries of the hub combine to form an approximately complete circle, and so that when a pendulum swings its forked ends will not extend beyond the hub peripheries.

As the damper is connected to the crank web and thus disposed in the engine crank case, no lubrication means is necessary. However, lubricating orifices 43 are provided for directing crank case oil from the crank web to the rollers 39 and to the engaging faces between the pendulums 35 and the wings 32.

While there has been hereinbefore described an approved embodiment of the invention, it will be understood that many and various changes and modifications in form, arrangement of parts and details of construction thereof, may be made without departing from the spirit of the invention and that all such changes and modifications as fall within the scope of the appended claims are contemplated as a part of this invention.

The invention claimed and desired to be secured by Letters Patent is:

1. An engine crank shaft having a crank web, said crank web having opposite faces extending transversely of said crank shaft and a peripheral face connecting said transverse faces and extending longitudinally of said crank shaft; and a torsional vibration damper having a hub mounted on said crank web, said hub having an inner face opposed to said peripheral face and lips overlapping said transverse faces, said hub being formed of two parts, each part being substantially U-shaped providing two legs and a yoke connecting said legs, said legs of one of said parts being directed toward said legs of the other of said parts and interfitting therewith with tongue-and-groove connections, said interfitting legs having aligned orifices extending through the tongue-and-groove connection thereof parallel to the axis of said crank shaft, said damper further having bolts extending through said orifices securing said parts together.

2. An engine crank shaft having a crank web, said crank web having opposite faces extending transversely of said crank shaft and a peripheral face connecting said transverse faces and extending longitudinally of said crank shaft; and a torsional vibration damper having an annular hub mounted on said crank web, said hub having opposite outer side faces, an inner face opposed to said peripheral face and lips overlapping said transverse faces, said hub being formed of two parts, each part being substantially U-shaped providing two legs and a yoke connecting said legs, said legs of one of said parts being directed toward said legs of the other of said parts and interfitting therewith with tongue-and-groove connections, said interfitting legs having aligned orifices extending through the tongue-and-groove connection thereof parallel to the axis of said crank shaft, said damper further having bolts extending through said orifices securing said parts together, a pair of spaced wings extending outwardly from each of said hub side faces, each of said wings having a bearing orifice, a pendulum spanning said spaced wings of each of said pairs, each pendulum having two bearing orifices in partial alignment with said two wing orifices adjacent thereto, and rollers extending through said partially aligned orifices, said rollers each being of shorter diameter than said orifices and securing said pendulums to said wings.

3. An engine crank shaft having a crank web, said crank web having opposite faces extending transversely of said crank shaft and a peripheral face connecting said transverse faces and extending longitudinally of said crank shaft; and a torsional vibration damper having a hub mounted on said crank web, said hub having an inner face opposed to said peripheral face and lips overlapping said transverse faces, said hub being formed of two parts, each part being substantially U-shaped providing two legs and a yoke connecting said legs, said legs of one of said parts being directed toward said legs of the other of said parts and interfitting therewith with tongue-and-groove connections, said interfitting legs having aligned orifices extending through the tongue-and-groove connection thereof parallel to the axis of said crank shaft, said damper further having bolts extending through said orifices securing said parts together, an inner face on one of said yokes engaging the adjacent portion of said crank web peripheral face, and a set screw threaded in an orifice in the other of said yokes and extending normally to and engaging said crank web peripheral face adjacent said other yoke.

4. An engine crank shaft having a crank web, said crank web having opposite faces extending transversely of said crank shaft and a peripheral face connecting said transverse faces and extending longitudinally of and parallel to the axis of said crank shaft; and a torsional vibration damper having a hub mounted on said crank web, said hub having an inner face opposed to said peripheral face and opposed sets of lips overlapping said transverse faces and securing said hub and crank web together against axial relative movement therebetween, said hub being formed of two parts, each part being substantially U-shaped providing two legs and a yoke connecting said legs, said legs of one of said parts being directed toward said legs of the other of said parts and interfitting therewith with tongue-and-groove connections, said interfitting legs having aligned orifices extending through the tongue-and-groove connection thereof parallel to the axis of said crank shaft, said damper further having bolts extending through said orifices securing said parts together.

5. A torsional vibration damper comprising an annular hub formed of two semi-annular parts secured together, said hub having an inner face adapted to be mounted on a crank web of an engine crank shaft, opposite outer side faces, and a pair of spaced wings extending outwardly from each of said hub side faces, each of said wings having a bearing orifice; a pendulum spanning said spaced wings of each of said pairs, each pendulum having two bearing orifices in partial alignment with said two wing orifices adjacent thereto; and rollers extending through said partially aligned orifices, said rollers each being of shorter diameter than said orifices and securing said pendulums to said wings.

PAUL S. VAUGHAN.
ARTHUR W. INFANGER.